United States Patent [19]
Wilson et al.

[11] Patent Number: 4,512,919
[45] Date of Patent: Apr. 23, 1985

[54] 2-METHOXY-4-(2-METHYLPROPENYL) PHENYL ESTER OF ISOBUTYRIC ACID, AND USE IN AUGMENTING OR ENHANCING AROMA OF PERFUME COMPOSITIONS, COLOGNES AND PERFUMED ARTICLES

[75] Inventors: Richard A. Wilson, Westfield; Michael J. Zampino, North Bergen; David R. Bowen, Red Bank; Domenick Luccarelli, Jr., Neptune, all of N.J.

[73] Assignee: International Flavors & Fragrances Inc., New York, N.Y.

[21] Appl. No.: 535,690

[22] Filed: Sep. 26, 1983

Related U.S. Application Data

[63] Continuation-in-part of Ser. No. 505,411, Jun. 16, 1983, Pat. No. 4,473,588.

[51] Int. Cl.³ .................. A61K 7/46; C11D 17/00
[52] U.S. Cl. .................... 252/522 R; 252/8.6; 252/174.11; 252/522 A
[58] Field of Search ............... 252/522 R, 8.6, 174.11

[56] References Cited

U.S. PATENT DOCUMENTS 4,071,568 1/1978 Bauer et al. ............... 252/522 R
4,383,943 5/1983 Britten-Kelly et al. ........ 252/522 R

*Primary Examiner*—Anton H. Sutto
*Attorney, Agent, or Firm*—Arthur L. Liberman

[57] ABSTRACT

Described is 2-methoxy-4-(methylpropenyl) phenyl ester of isobutyric acid having the structure:

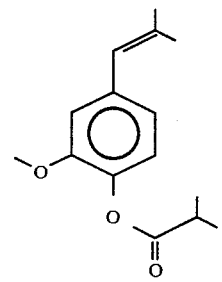

and uses thereof in augmenting or enhancing the aroma of perfume compositions, perfumed articles and colognes.

6 Claims, 5 Drawing Figures

GLC PROFILE FOR EXAMPLE I, BULKED FRACTIONS
(3-8)

FIG.1

GLC PROFILE FOR EXAMPLE I, BULKED FRACTIONS (3-8)

FIG. 2

GLC PROFILE FOR EXAMPLE I, MAGNIFICATION.
BULKED FRACTIONS 3-8.

FIG. 3
MASS SPECTRUM FOR PEAK 21, EXAMPLE I.

FIG. 4
NMR SPECTRUM FOR PEAK 21 OF FIG. 2, EXAMPLE I.

2-METHOXY-4-(2-METHYLPROPENYL) PHENYL ESTER OF ISOBUTYRIC ACID, AND USE IN AUGMENTING OR ENHANCING AROMA OF PERFUME COMPOSITIONS, COLOGNES AND PERFUMED ARTICLES

This application is a continuation-in-part of application for U.S. patent Ser. No. 505,411 filed on June 16, 1983 now U.S. Pat. No. 4,473,588.

BACKGROUND OF THE INVENTION

The present invention relates to 2-methoxy-4-(2-methylpropenyl)phenyl ester of isobutyric acid having the structure:

and uses thereof in augmenting or enhancing the aroma of perfume compositions, colognes and perfumed articles (including solid or liquid anionic, cationic, nonionic or zwitterionic detergents, fabric softener compositions and fabric softener articles, cosmetic powders, hair preparations and perfumed polymers).

There has been considerable work performed relating to substances which can be used to impart (augment or enhance) fragrances to (or in) various consumable materials. These substances are used to diminish the use of natural materials some of which may be in short supply and to provide more uniform properties in the finished product.

Woody, spicy, lily-like and low keyed vanillin-like aromas with sweet, vanilla-like, chocolate and fruity undertones are highly desirable for many uses in perfume compositions, perfumed articles and colognes.

Acet-iso-eugenol having the structure:

is described in "Perfume and Flavor Chemicals (Aroma Chemicals)" by Steffen Arctander, 1969, (Monograph 15) as having a fruity-balsamic, warm and faintly spicy odor, somewhat clove-like, but with rosy floral notes and vanilla-like sweetness. In flavors Arctander indicates that this material is for berry, fruit and spice compositions and useful in concentrations of from 0.4 up to 17 ppm. Acet-iso-eugenol is G.R.A.S. on the F.E.M.A. list as No. 2470. Vanillin acetate having the structure:

is described by Nunomura, et al in Agric.Biol.Chem. 44 (2), 339,351 (at page 345) to be a flavor component in the acetic fraction of Shoyu (soy sauce).

Nothing in the prior art discloses or infers the compound having the structure:

or its use in augmenting or enhancing the aroma of perfume compositions, perfumed articles and colognes.

BRIEF DESCRIPTION OF THE DRAWINGS

as well as the compound having the structure.

(conditions: Field strength: 100 MHz, solvent: CFCl₃).

DETAILED DESCRIPTION OF THE DRAWINGS

Figure 1:
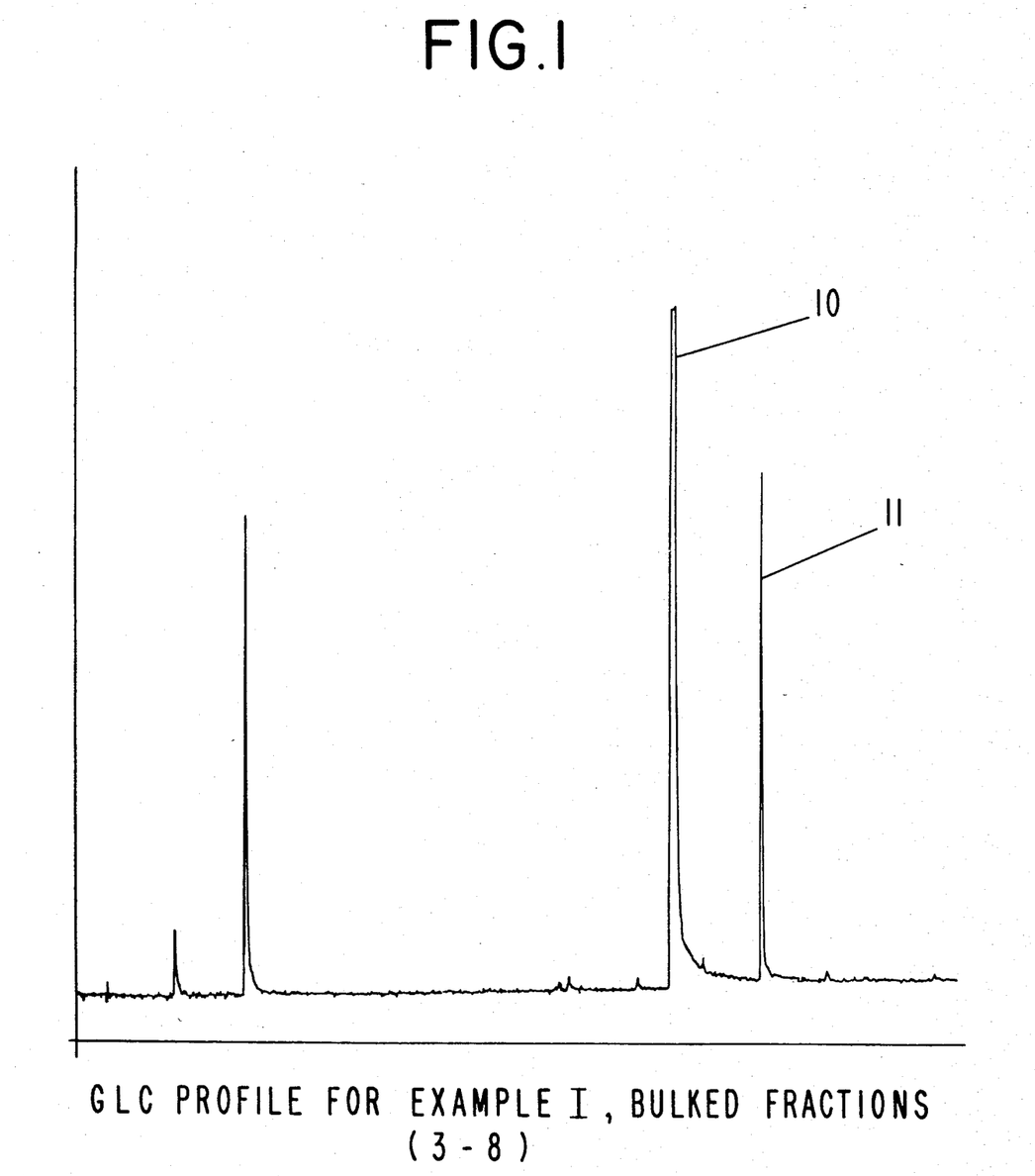
FIG. 1 is the GLC profile for bulked fractions 3-8 of the distillation product of the reaction product of Example I containing the compound having the structure.
Figure 2:
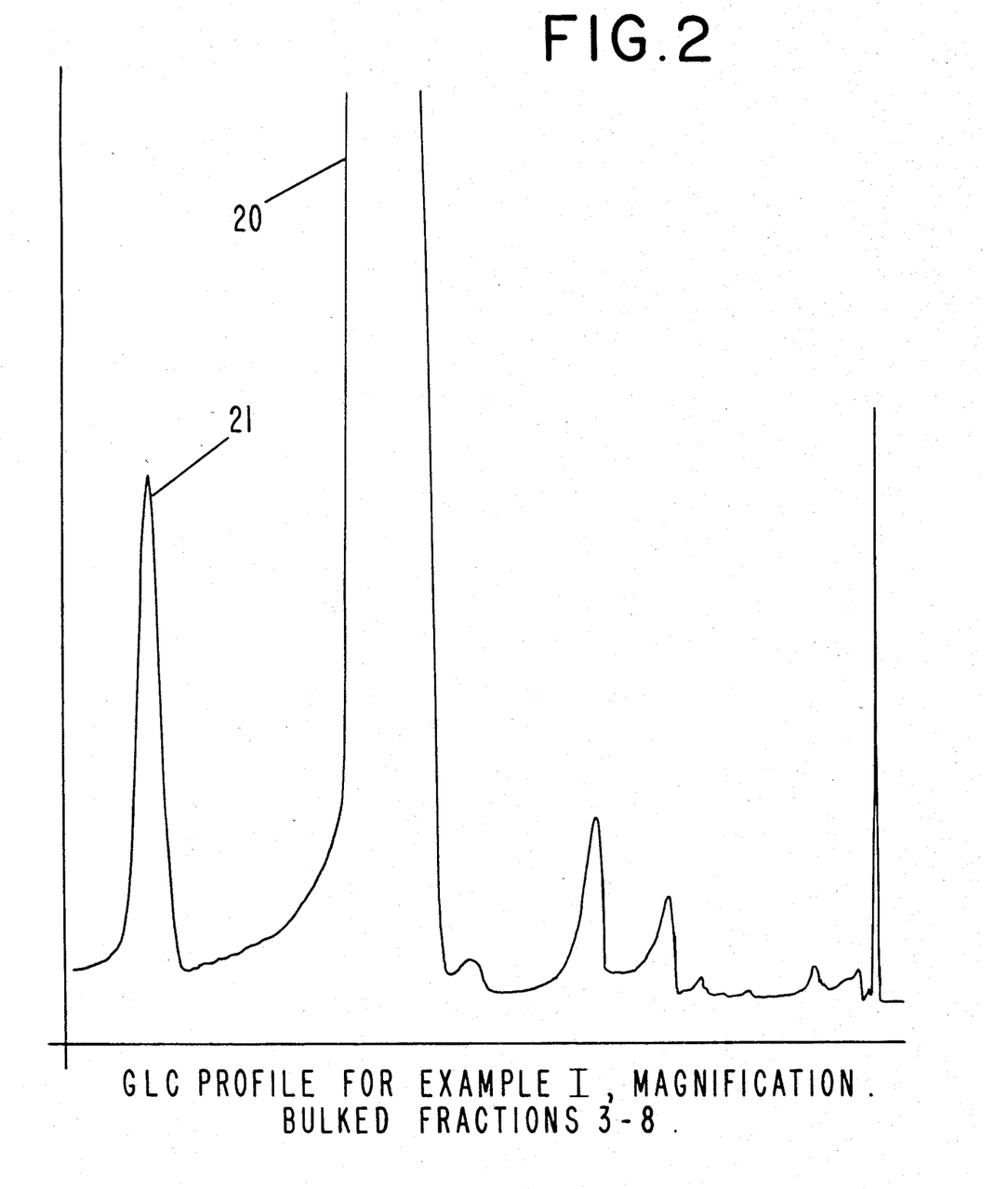
FIG. 2 is a magnification of the GLC profile of FIG. 1, for bulked fractions 3-8 of the distillation product of the reaction product of Example I containing the compound having the structure.

FIG. 1 is the GLC profile for bulked fractions 3–8 of the distillation product of the reaction product of Example I containing the compounds having the structures:

The GLC conditions are: SE-30, column programmed at 100°–225° C. at 4° C. per minute. The peak indicated by reference numeral "10" is the peak for the compound having the structure:

The peak indicated by reference numeral "11" is the peak for the compound having the structure:

FIG. 2 is a magnification of the GLC profile of FIG. 1 (conditions: 10'×¼", SE 30, column programmed at 100°–220° C. at 4° C. per minute). The peak indicated by reference numeral "21" is the peak for the compound having the structure:

The peak indicated by reference numeral "20" is the peak for the compound having the structure:

THE INVENTION

It has now been discovered that novel solid and liquid perfume compositions, colognes and perfumed articles having natural woody, spicy, lily-like and low keyed vanilla-like odors with sweet, vanilla-like, chocolate-like and fruity undertones may be provided by use of 2-methoxy-4-(2-methylpropenyl)phenyl ester of isobutyric acid having the structure:

The 2-methoxy-4-(2-methylpropenyl)phenyl ester of isobutyric acid having the structure:

may be produced by first reacting vanillin having the structure:

with isobutyric anhydride according to the reaction:

thereby producing vanillin isobutyrate having the structure:

and the intermediate having the structure:

This intermediate on distillation then liberates carbondioxide according to the reaction:

The overall reaction sequence may thus be shown as follows:

and

The mole ratio of isobutyric anhydride:vanillin may vary from about 2.5:2 up to about 5:2 with a preferred mole ratio of isobutyric anhydride:vanillin of about 3.5:2.

The reaction temperature is preferably at reflux conditions (e.g., 175° C. at atmospheric pressure). Preferably the reaction is carried out at super atmospheric pressures, (e.g., greater than one atmosphere, that is, from about 1 up to about 10 atmospheres) and temperatures greater than 175° C. (e.g., 175°–250° C.). Higher temperatures give rise to pyrolysis of the reaction product and are thus undesirable. The reaction time may vary from about six hours up to about thirty hours depending upon the reaction temperature and pressure utilized. Lower reaction temperatures and pressures require higher periods of reaction upwards of 24–30 hours, and higher reaction temperatures and pressures give rise to lower reaction time (e.g., 6–10 hours). At the end of the reaction, the reaction mass is neutralized with such materials as saturated aqueous sodium bicarbonate and dried. The reaction mass is then distilled on a fractionation column yielding fractions which are rich in the compound having the structure:

and weak in the compound having the structure:

After the final fractionation, the fractions rich in the compound having the structure:

may be finally purified to yield 100 percent of 2-methoxy-4-(2-methylpropenyl)phenyl ester of isobutyric acid of our invention by means of preparative column chromatography techniques which are well known in the art.

The 2-methoxy-4-(2-methylpropenyl)phenyl ester of isobutyric acid of our invention having the structure:

is capable of augmenting or enhancing wood natural woody, spicy, lily-like and vanilla aromas with sweet, vanilla-like, chocolate-like and fruity undertones in perfume compositions, colognes and perfumed articles.

The 2-methoxy-4-(2-methylpropenyl)phenyl ester of isobutyric acid of our invention and one or more auxiliary perfume ingredients including, for example, alcohols, aldehydes, ketones, nitriles, esters other than the 2-methoxy-4-(2-methylpropenyl)phenyl ester of isobutyric acid of our invention, cyclic esters (lactones), dialkyl ethers, alkyl alkenyl ethers, thioethers, thiols, carboxylic acids and hydrocarbons and natural essential oils and synthetic essential oils may be so admixed so that the combined odors of the individual components produce a pleasant and desired fragrance particularly and preferably in the natural woody aroma area. Such perfume compositions usually contain (a) the main note or the bouquet or the foundation stone of the composition; (b) modifiers which round off and accompany the main notes; (c) fixatives which include odorous substances which lend a particular note to the perfume throughout all stages of evaporation and substances which retard evaporation and (d) topnotes which are usually low-boiling, fresh-smelling materials.

In perfume compositions, it is the individual components which contribute to their particular olfactory characteristics; however, the overall sensory effect of the perfume composition will be at least the sum total of the effect of each of the ingredients. Thus, the 2-methoxy-4-(2-methylpropenyl)phenyl ester of isobutyric acid of our invention can be used to alter, modify or enhance the aroma characteristics of a perfume composition, for example, by utilizing or moderating the olfactory reactions contributed by another ingredient in the composition.

The amount of 2-methoxy-4-(2-methylpropenyl)phenyl ester of isobutyric acid of our invention which will be effective in perfume compositions as well as in perfumed articles and colognes depends on many factors, including the other ingredients, their amounts and the effects which are desired. It has been found that perfume compositions containing as little as 0.01% of the 2-methoxy-4-(2-methylpropenyl)phenyl ester of isobutyric acid of our invention or even less (e.g. 0.005%), can be used to impart a very natural woody, spicy, lily-like and low keyed vanilla aroma with sweet vanilla-like, chocolate and fruity undertones to soaps, cosmetics and other products. The amount employed can range up to 70% of the fragrance components and will depend on considerations of cost, nature of the end product, the effect desired on the finished product and the particular fragrance sought.

The 2-methoxy-4-(2-methylpropenyl) phenyl ester of isobutyric acid of our invention is useful (taken alone or taken together with other ingredients in perfume compositions) as (an) olfactory component(s) in detergents and soaps, space odorants and deodorants, perfumes, colognes, toilet waters, bath preparations such as lacquers, brilliantines, pomades, and shampoos; cosmetic preparations such as creams, deodorants, hand lotions and sun screens; powders such as talcs, dusting powders, face powders and perfumed article compositions of matter such as perfumed polypropylene, polyethylene and polyurethanes, partially long-lasting, partially short-lasting mixtures of, for example, encapsulated perfumes suspended in free perfume compositions and the like. When used as (an) olfactory component(s), as little as 0.1% of the 2-methoxy-4-(2-methylpropenyl) phenyl ester of isobutyric acid of our invention will suffice to impart an intense woody, spicy, lily-like and vanilla-like aroma with sweet vanilla-like, chocolate-like and fruity undertones. Generally no more than 3% of the 2-methoxy-4-(2-methylpropenyl) phenyl ester of isobutyric acid of our invention based on the ultimate end product is required in the perfume composition.

In addition, the perfume composition or fragrance composition of our invention can contain a vehicle or carrier for the 2-methoxy-4-(2-methylpropenyl) phenyl ester of isobutyric acid. The vehicle can be a liquid such as a non-toxic alcohol (e.g. ethyl alcohol), a non-toxic glycol (e.g. propylene glycol or 1,2-butylene glycol or sorbitol) or the like. The carrier can also be an absorbent solid such a gum (e.g. gum arabic, xanthan gum, guar gum or the like) or components for encapsulating the material (such as gelatin or ethyl cellulose as by coacervation).

When used as a component of a perfumed article such as a perfumed plastic or solid or liquid anionic, cationic, nonionic or zwitterionic detergent or a drier-added fabric softener article or fabric softener composition or a shampoo or a soap, the range of 2-methoxy-4-(2-methylpropenyl) phenyl ester of isobutyric acid usable varies from 0.005% up to about 5% by weight of the perfumed article. The lower range of this range, e.g. 0.005%, up to 0.1% of the 2-methoxy-4-(2-methylpropenyl) phenyl ester of isobutyric acid of our invention is most preferred when using it in a drier-added fabric softener article or fabric softener composition in view of the need for a "non-perfumy" but pleasant head space aroma above the batch of clothes dried using the drier-added fabric softener article or fabric softener composition in a standard automatically operated tumbler drier.

It will thus be apparent that the 2-methoxy-4-(2-methylpropenyl) phenyl ester of isobutyric acid of our invention can be utilized to augment, alter and modify or enhance sensory properties, particularly organoleptic properties, of a wide variety of consumable materials.

The following examples are illustrative and the invention is to be considered to be restricted thereto only as indicated in the appended claims. Example I sets forth a process for producing 2-methoxy-4-(2-methylpropenyl) phenyl ester of isobutyric acid of our invention. Example II, et seq set forth the organoleptic utilities of the 2-methoxy-4-(2-methylpropenyl) phenyl ester of isobutyric acid of our invention.

All parts and percentages given herein are by weight unless otherwise specified.

EXAMPLE I

Preparation of 2-Methoxy-4-(2-Methylpropenyl) Phenyl Ester of Isobutyric Acid

Reaction:

and

Into a 2-liter reaction flask equipped with condenser, stirrer, heating mantle and thermometer is placed 304 grams (2 moles) of vanillin having the structure:

and 553 grams (3.5 moles) of isobutyric anhydride having the structure:

With stirring the reaction mass is heated to reflux (175° C.). The reaction mass is refluxed at atmospheric pressure for a period of twelve hours.

The reaction mass is then washed with equal volumes of saturated sodium bicarbonate solution and followed by saturated sodium chloride solution.

The reaction mass is then dried over anhydrous magnesium sulphate filtered and distilled on a one plate splash column yielding the following fractions:

| Fraction No. | Vapor Temp. (°C.) | Liquid Temp. (°C.) | Vacuum mm/Hg. Pressure | Weight of Fraction |
|---|---|---|---|---|
| 1 | 48/49 | 67/75 | 4.0 | 157.3 |
| 2 | 40 | 154 | 4.0 | 78.0 |
| 3 | 150 | 165 | 5.5 | 28.0 |
| 4 | 155 | 164 | 5.5 | 87.4 |
| 5 | 156 | 164 | 5.5 | 39.3 |
| 6 | 155 | 171 | 5.5 | 58.2 |
| 7 | 185 | 150 | 5.5 | 48.6 |
| 8 | 190 | 150 | 5.5 | 41.2 |

Fractions 3–8 are bulked for refractionation. FIG. 1 is the GLC profile for bulked fractions 3–8. The peak indicated by reference numeral "10" is the peak for the compound having the structure:

The peak indicated by reference numeral "11" is the peak for the compound having the structure:

FIG. 2 is a magnification of FIG. 1. The peak indicated by reference numeral "21" is the peak for the compound having the structure:

The peak indicated by reference numeral "20" is the peak for the compound having the structure:

The conditions for the GLC analyses are 10'×¼", SE 30, column programmed at 100°–220° C. at 4° C. per minute.

Figure 3:
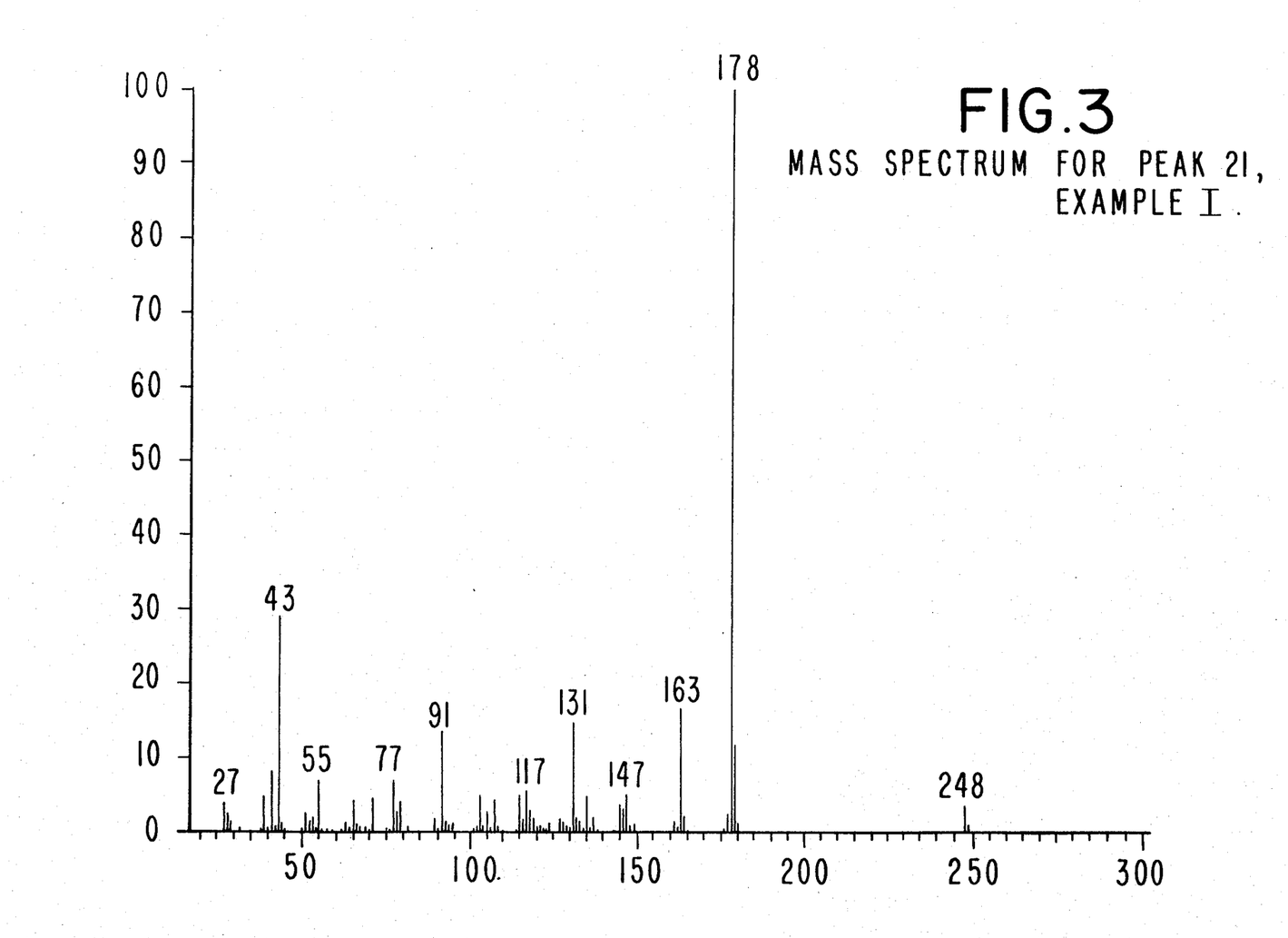
FIG. 3 is the mass spectrum for the peak indicated by reference numeral "21" of FIG. 2 (the GLC profile for bulked fractions 3–8 of the distillation product of the reaction product of Example I). Peak "21" consists of the compound having the structure.
Figure 4:
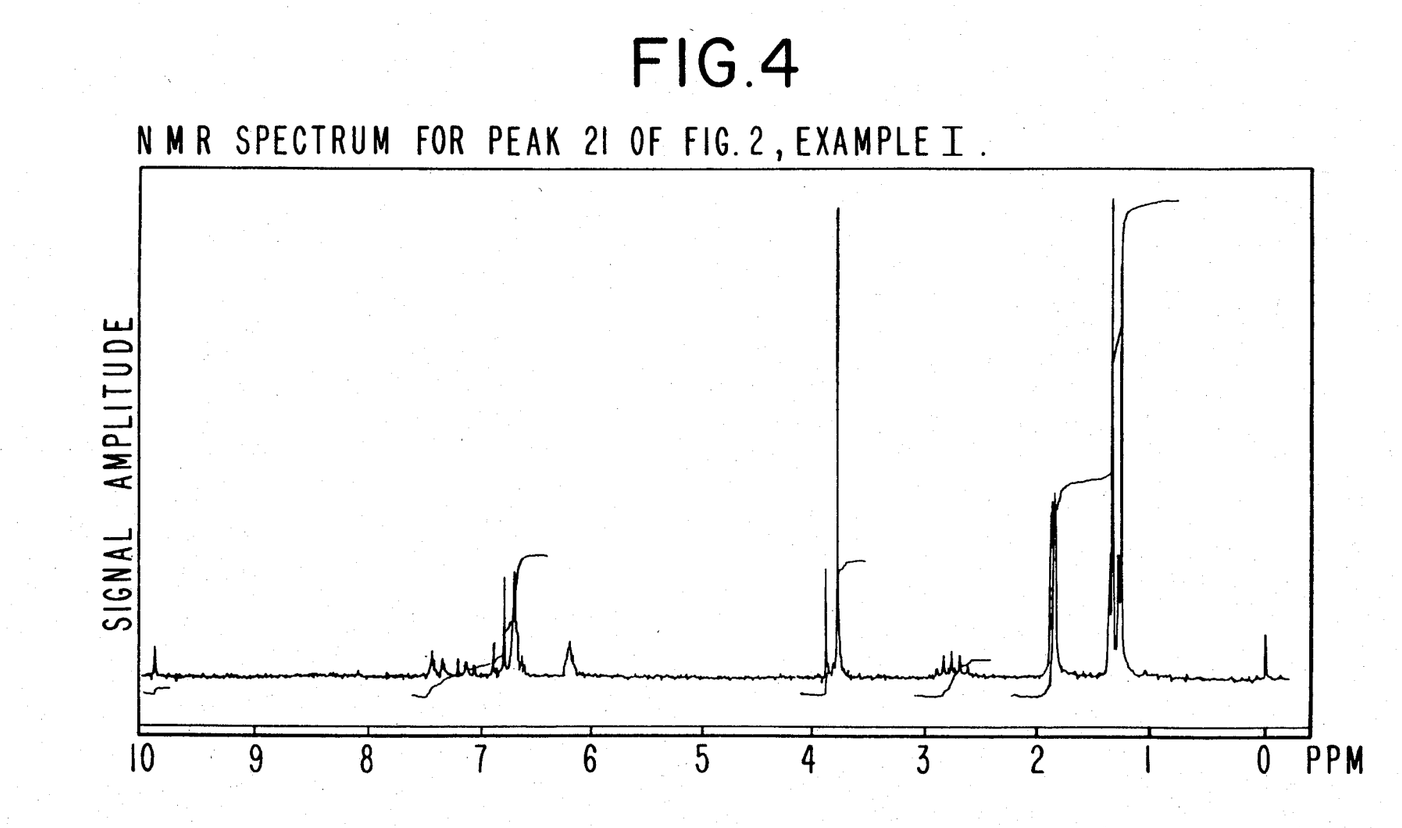
FIG. 4 is the NMR spectrum for peak "21" of FIG. 2, for the compound having the structure.

FIG. 3 is the mass spectrum for peak "21" of the GLC profile of FIG. 2 for the compound having the structure:

FIG. 4 is the NMR spectrum for peak "21" of the GLC profile of FIG. 2 for the compound having the structure:

(Conditions: Field strength 100 MHz; Solvent: CFCl$_3$).

Figure 5:
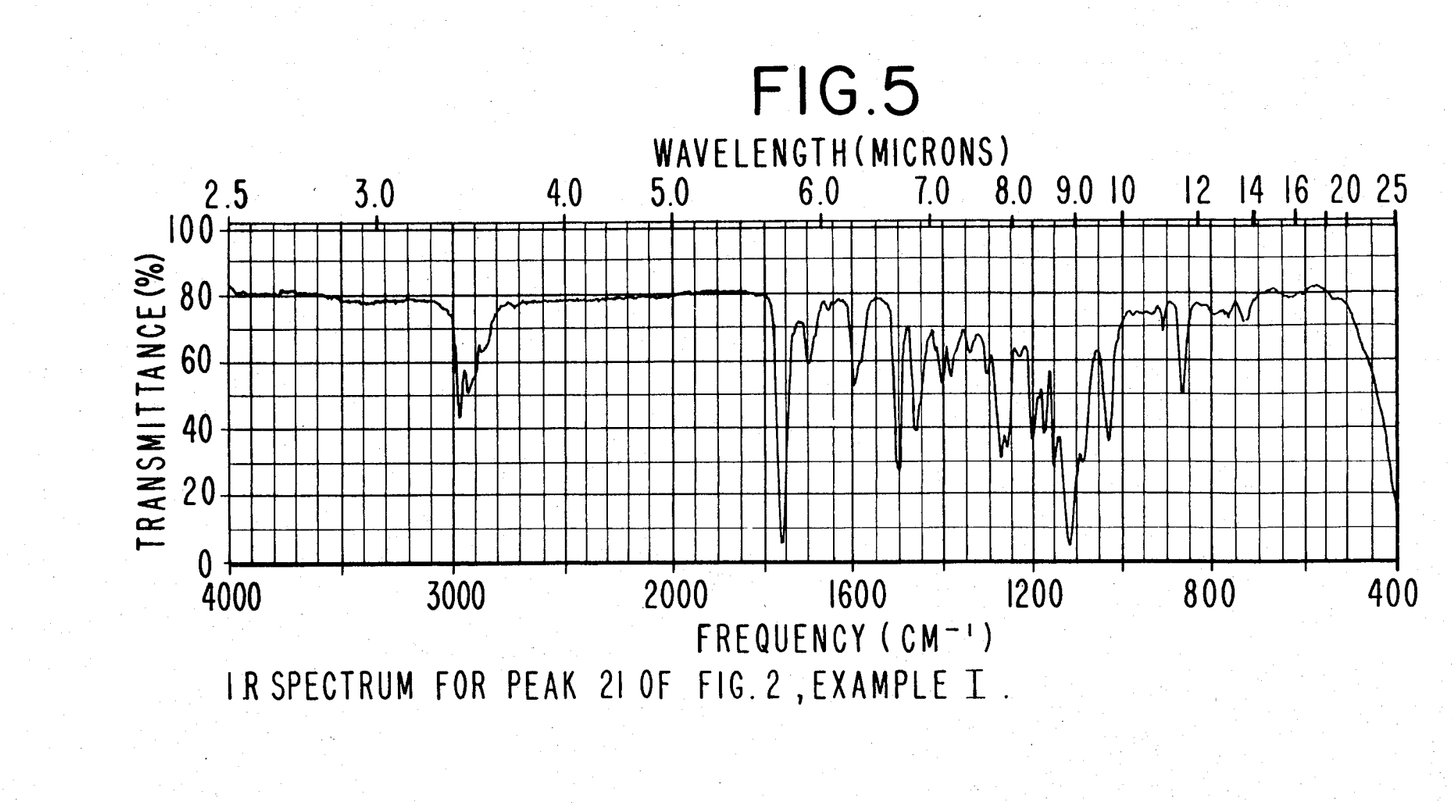
FIG. 5 is the infra-red spectrum for the peak indicated by reference numeral "21" on the GLC profile of FIG. 2 for the compound having the structure.

FIG. 5 is the infra-red spectrum for peak "21" of the GLC profile of FIG. 2 for the compound having the structure:

Bulked fractions 3–8 are then redistilled on a one foot Vigreux column yielding the following fractions:

| Fraction No. | Vapor Temp. (°C.) | Liquid Temp. (°C.) | Vacuum mm/Hg. Pressure | Weight of Fraction |
|---|---|---|---|---|
| 1 | 126 | 185 | 5.0 | 7.7 |
| 2 | 114 | 186 | 6.0 | 56.7 |
| 3 | 84 | 182 | 6.0 | 12.5 |
| 4 | 110 | 215 | 5.0 | 26.8 |
| 5 | 74 | 230 | 5.0 | 6.2 |

Fractions 2–5 are bulked and contain a major proportion of the compound having the structure:

is then purified by preparative chromatographic separation. The compound having the structure:

has a natural woody, spicy, lily-like and vanilla-like aroma with sweet, vanilla, chocolate-like and fruity undertones.

EXAMPLE II

Magnolia Formulation

To demonstrate the use of the 2-methoxy-4-(2-methylpropenyl) phenyl ester of isobutyric acid prepared according to Example I, in a magnolia formulation, the following formula is provided:

| Ingredient | Parts by Weight |
|---|---|
| Phenylethyl alcohol | 200 |
| Geraniol | 400 |
| Trichloromethylphenyl carbinyl acetate | 20 |
| Phenylethyl acetate | 60 |
| Undecylenic aldehyde (10% in diethyl phthalate) | 5 |
| n-nonyl aldehyde (10% in diethyl phthalate) | 2 |
| Musk ketone | 10 |
| Musk ambrette | 10 |
| Eugenol phenyl acetate | 20 |
| Citronellol | 100 |
| Vanillin (10% in diethyl phthalate) | 6 |
| Eugenol | 30 |
| Citronellyl formate | 30 |
| Geranyl acetate | 10 |
| Linalool | 40 |
| Geranyl phenyl acetate | 50 |
| Cis beta, γ-hexenyl acetate | 2 |
| 1-(2,5,5-trimethyl-1,3-cyclo-hexadien-1-yl)-1,3-butanedione | 5 |
| Farnesene isomer mixture produced according to Example I of U.S. Letters Pat. No. 4,394,444 | 60 |
| 2-methoxy-4-(2-methylpropenyl) phenyl ester of isobutyric acid produced according to Example I supra | 120 |

The addition of the 2-methoxy-4-(2-methylpropenyl) phenyl ester of isobutyric acid lends a great deal of strength and character to the magnolia fragrance and also imparts to it a woody, spicy, lily-like and vanilla-like aroma with sweet, vanilla and chocolate-like and fruity undertones. The overall formulation can be described as "magnolia with woody, spicy, lily-like and vanilla-like topnotes and sweet, vanilla-like, chocolate-like and fruity undertones".

EXAMPLE III

Preparation of Soap Composition

One hundred grams of soap chips are produced according to Example V of U.S. Pat. No. 4,058,487 issued on Nov. 15, 1977 as follows:

The sodium salt of an equal mixture of $C_{10}$–$C_{14}$ alkane sulfonates (95% active), 40 pounds, is dissolved in a mixture of 80 pounds of anhydrous isopropanol and 125 pounds of dionized water at 150° F. In this mixture is dissolved 10 pounds of partially hydrogenated coconut oil, fatty acids and 15 pounds of sodium mono-$C_{14}$-alkylmaleate and the pH of the solution is adjusted to 6.0 by the addition of a small amount of a 50% aqueous solution of sodium hydroxide. The isopropanol is distilled off and the remaining aqueous solution is drum dried. The resulting solid actives are then blended in a chip mixture with 10 pounds of water, 0.2 pounds titanium hydroxide and 0.75 pounds of one of the materials set forth in Table I below:

TABLE I

| Perfume Ingredient | Aroma Profile |
|---|---|
| 2-methoxy-4-(2-methylpropenyl) phenyl ester of isobutyric acid produced according to Example I | An intense woody, spicy, lily-like and vanilla aroma with vanilla-like, chocolate-like and fruity undertones. |
| Perfume composition of Example II | Magnolia with woody, spicy, lily-like and vanilla-like topnotes and sweet, vanilla-like, chocolate-like and fruity undertones. |

The chips are then plodded into logs, cut to size and finally stamped into bars, having a pH of approximately 6.9.

Each of the perfumed soaps of Table I above manifests an excellent characteristic as indicated in Table I above.

EXAMPLE IV

Preparation of A Detergent Composition

A total of 100 grams of a detergent powder prepared according to U.S. Pat. No. 4,058,472 and containing 5% by weight of the sodium salts of a mixture of sulfonated $C_{14}$–$C_{18}$ alkyl catechol as a surface active component, the mixture being 60 parts by weight of mono-$C_{14}$–$C_{18}$ alkyl catechol and 40 parts by weight of di-$C_{14}$–$C_{18}$ alkyl catechol, 35% of sodium tetrapyrophosphate, 30% of sodium silicate, 20% of sodium carbonate, 3% of sodium carboxymethyl cellulose and 7% of starch is mixed with 0.15 grams of one of the perfume ingredients of Table I of Example III, supra, until a substantially homogeneous composition is obtained. This composition has an excellent aroma as indicated according to Table I of Example III, supra.

EXAMPLE V

Preparation of Cosmetic Powder Compositions

A cosmetic powder is prepared by mixing in a ball mill 100 grams of talcum powder with 0.25 grams of one of the perfume materials of Table I of Example III, supra. Each of the cosmetic powders has an excellent aroma as set forth in Table I of Example III, supra.

EXAMPLE VI

Perfumed Liquid Detergents

Concentrated liquid detergents having aromas as set forth in Table I of Example III, supra, are prepared by adding 0.10%, 0.15% and 0.20% of each of the perfume ingredients of Table I of Example III, supra. They are prepared by adding and homogeneously mixing the appropriate quantity of perfume material in the liquid detergent. The detergents all possess aromas as set forth in Table I of Example III, supra.

EXAMPLE VII

Preparation of Cologne and Handkerchief Perfumes

Each of the compositions of Table I of Example III, supra, is incorporated into colognes at several concentrations, 2.0%, 2.5%, 3.0%, 3.5%, 4.0%, and 5.0% in 70%, 75%, 80%, 85% and 90% aqueous ethanol; and into handkerchief perfumes at concentrations of 10%, 15%, 20% and 25% (in 80%, 85%, 90% and 95% aqueous ethanol). The use of each of the perfume ingredients as set forth in Table I of Example III, supra, affords distinctive aromas as set in Table I of Example III, supra.

EXAMPLE VIII

Preparation of a Detergent Composition

A total of 100 grams of a detergent powder (a non-ionic detergent powder containing a proteolytic enzyme prepared according to Example I of Canadian Patent No. 985,190 issued on Mar. 9, 1976) is mixed with 0.15 grams of a perfume material set forth in Table I of Example III, supra, until a substantially homogeneous composition is obtained in each case. Each of the compositions has an excellent aroma as set forth in Table I of Example III, supra.

EXAMPLE IX

Utilizing the procedure of Example I at column 15 of U.S. Pat. No. 3,632,396 (which is hereby incorporated by reference into the instant specification), a nonwoven cloth substrate useful as a dryer-added fabric softening article of manufacture is prepared wherein the substrate, the substrate coating and the outer coating and the perfume material are as follows:
1. a water "dissolvable" paper ("Dissolvo Paper");
2. Adogen 448 (m.p. about 140° F.) as the substrate coating; and
3. an outer coating having the following formulation (m.p. about 150° F.):
57% $C_{20-22}$ HAPS
22% isopropyl alcohol
20% antistatic agent
1.5% of one of the perfume materials of Table I of Example III, supra.

A fabric softening composition prepared as set forth above having an aroma characteristic as set forth in Table I of Example III, supra, consists of a substrate having a weight of about 3 grams per 100 square inches, a substrate coating of about 1.85 grams per 100 square inches of substrate and an outer coating of about 1.4 grams per 100 square inches of substrate, thereby providing a total aromatized substrate and an outer coating weight ratio of about 1:1 by weight of the substrate. The resulting aromas can be described as set forth in Table I of Example III, supra, and are imparted in pleasant manners to the head space in the dryer on operation thereof using said dryer-added fabric softening nonwoven fabric.

EXAMPLE X

Perfumed Polyethylene

Scented polyethylene pellets having a pronounced aroma as set forth in Table I of Example III, supra, are prepared as follows (in accordance with Example III of U.S. Pat. No. 3,505,432 which is incorporated by reference herein):

75 pounds of polyethylene of a melting point of about 220° F. are heated to about 230° F. in a container as illustrated in FIGS. 1 and 2 of U.S. Pat. No. 3,505,432. 25 pounds of one of the perfume materials of Table I of Example III, supra, are then quickly added to the liquified polyethylene, the lid is put in place and the agitating means are actuated. The temperature is maintained at about 225° F. and the mixing is continued for about 15 minutes. The valve is then opened to allow flow of the molten polyethylene enriched with the perfume containing material to exit through the orifices as indicated in FIGS. 1 and 2. The liquid falling through the orifices solidifies almost instantaneously upon impact with the moving cooled conveyor. Solid polyethylene beads or pellets having a pronounced aroma as set forth in Table I of Example III, supra, are thus formed. Analysis demonstrates that the pellets contain about 25% of the perfume substance of Table I of Example III, supra, so that almost no losses of the scenting substance occur. These pellets may be called master pellets. 50 pounds of the perfume substance containing master pellets are then added to 1000 pounds of unscented polyethylene powder and the mass is heated to the liquid state. The liquid is molded into thin sheets or films. The sheets or films have a pronounced aroma as set forth in Table I of Example III, supra.

EXAMPLE XI

Scented Polypropylene

100 pounds of polypropylene are heated to about 300° F. 30 pounds of one of the aroma materials of Table I of Example III, supra, are added to the liquified polypropylene. The procedure is carried out in the apparatus of FIGS. 1 and 2 of U.S. Pat. No. 3,505,432. After mixing for about 8 minutes, the valve is opened to allow the exit of the polypropylene-scented material mixture whereby solid pellets having a pronounced aroma as set forth in Table I of Example III, supra, are formed on the conveyor. The pellets thus obtained are then admixed with about 20 times their weight of unscented polypropylene and the mixture is heated and molded into flat discs. The flat discs have a strong and pleasant aroma as set forth in Table I of Example III, supra.

EXAMPLE XII

A perfumed polymer is produced by admixing a microporous polymer produced according to one of Examples 194–236 of U.S. Pat. No. 4,247,498 (the disclosure of which is incorporated by reference herein), and applying a 0.5 mm/Hg vacuum to the system. The resulting product is then compressed into pellets and molded into fragrance-emitting plastic objects, e.g. automobile dashboards.

What is claimed is:

1. A process for augmenting or enhancing the aroma of a consumable material selected from the group consisting of perfume compositions, colognes and perfumed articles comprising the step of adding to said consumable material an aroma augmenting or enhancing quantity of the compound having the structure:

2. The process of claim 1 wherein the consumable material is a perfume composition.

3. The process of claim 1 wherein the consumable material is a cologne.

4. The process of claim 1 wherein the consumable material is a perfumed article and the perfumed article is a solid or liquid anionic, cationic, nonionic or zwitterionic detergent.

5. The process of claim 1 wherein the consumable material is a perfumed article and the perfumed article is a perfumed polymer.

6. The process of claim 1 wherein the consumable material is a perfumed article and the perfumed article is a fabric softener composition or drier added fabric softener article.

* * * * *